Patented Dec. 17, 1946

2,412,611

UNITED STATES PATENT OFFICE 2,412,611

MOLDING COMPOSITIONS AND ARTICLES THEREOF

Walter E. Gloor, New Brunswick, N. J., assignor to Hercules Powder Company, Wilmington, Del., a corporation of Delaware No Drawing. Application January 26, 1945, Serial No. 574,815

16 Claims. (Cl. 106—179)

This invention relates to shaped masses or articles of thermoplastic compositions of improved usefulness at extreme temperatures, and it relates to molding compositions and molding powders for preparing such masses or articles and to thermal molding thereof. More particularly, it relates to such articles and compositions in which cellulose acetate and a plasticizer therefor are essential ingredients.

As is well known, equipment for aviation and certain other uses requires parts which are light, tough, and readily shaped. Cellulose acetate plastics are suitable at normal temperatures and have excelled other plastics at normal and moderately elevated temperatures because of their great ease of moldability and toughness. However, at very low temperatures such as those encountered at high altitudes, for example —40° F., these plastics become quite brittle. At such low temperatures, window sheeting and safety glass interlayers cease to be shatterproof; likewise, molded articles have very low impact strength, behaving much like glass.

Expedients improving impact strength at 70° F., such as increasing plasticizer content to the point at which the plastics become too soft to be usable at any elevated temperature, have had little or no effect on impact strength in the cold. Thus, cellulose acetate plastics have been satisfactory in use only in a limited range of temperature and have been unsatisfactory wherever they might be subject to impact stresses at low temperatures.

In accordance with this invention, it has been found that shaped or molded masses or articles resistant to impact at very low temperatures, such as —40° F., can be prepared by combining with a plasticizer a cellulose acetate of such high intrinsic viscosity that, upon molding or shaping the resulting plastic mass, the cellulose acetate therein will have an intrinsic viscosity above about 1.5. It has also been found necessary, to obtain high impact strength at low temperatures, to limit the cellulose acetate utilized in the production of the plastic masses or articles to one having a combined acetic acid content between about 52.0% and about 56.0%.

Intrinsic viscosity is a fundamental property of a cellulose ester. By definition, it involves a viscosity function at zero solution concentration and is measurable only in dilute solutions. Thus, it is not analogous to usual viscosity characteristic constants which are measured in 10–25% concentrations. It will be understood, therefore, that, while the intrinsic viscosity may in some cases appear to bear a general relation to viscosity as usually measured, it is not the same thing as the viscosity designation under which cellulose esters are usually typed for marketing, and does not bear any fixed relationship thereto.

In accordance with this invention, the intrinsic viscosity of the cellulose acetate is above about 1.5 in the finished shaped plastic or article; that is, the viscosity must be measured after molding or shaping to determine if it is above about 1.5. The manufacture of molding powder and the molding of articles therefrom involve degrading conditions and, accordingly, the cellulose acetate used as the starting material will comprise essentially stable cellulose acetate of intrinsic viscosity above about 1.7. In making the molding powder, plasticizer for the ester will be used in an amount at least sufficient to impart and insure moldability of the composition. Molding by heat and pressure at temperatures somewhat higher than would normally be used for a similar composition with usual cellulose acetates may then be carried out to shape the plastic without causing intrinsic viscosity to drop below 1.5.

The most striking result obtained is the achievement of the property of toughness at extremely low temperatures where previously cellulose acetate plastics were brittle. However, there is also an improvement at elevated temperatures. It has been found that heat distortion or tendency to flow under very warm use conditions is decreased in the articles in accordance with this invention. Expressed in another way, a higher temperature is necessary to cause deformation of the article at a given stress. The usual heat distortion and flow temperature measurements both show a significant improvement.

The invention will be illustrated by examples of typical cellulose acetate plastic compositions and properties of test bars molded therefrom, and, for comparison, the properties of like compositions or articles based on acetates having typical intrinsic viscosities relatively high for acetates known to have been molded heretofore will also be given. For each example and comparator, the composition ingredients were mixed to form a paste with the aid of solvent composed of equal parts of acetone and alcohol in a quantity of 60% of the total nonvolatile ingredients. The paste was then worked on a differential speed two-roll mill for ten minutes while gradually heating the rolls to 190° F. The resulting colloided plastic composition was then rolled at 190° F. for ten minutes to remove the volatile solvent. It was then sheeted on the rolls, removed therefrom, cooled, reduced to a molding powder, and seasoned 16 hours at 140° F. to eliminate any remaining volatile solvent. Test bars and other articles were formed by injection molding at temperatures indicated. Heat distortion and flow temperatures were likewise determined by the A. S. T. M. methods. Parts of materials are in all cases by weight.

Table I gives compositions using two different lots of high intrinsic viscosity cellulose acetate and several different plasticizer mixtures. In each case, a comparator of like formulation but based on normal plastics acetate is also shown. It will be noted that, regardless of formulation, there is an increase of well over 100% in Izod impact strength at −40° F. for the molded plastic in accordance with this invention over the related prior plastic; i. e., impact strength is more than doubled. Izod impact strengths of 0.2–0.3 ft.-lbs./in. notch are representative of brittle materials substantially devoid of toughness; hence, achievement of impact values of 0.5–0.7 represents introduction of toughness. It will also be noted that the flow temperature is higher for the plastic based on high intrinsic viscosity acetate; this difference is found in both the soft formulation of Example 4 and the hard formulation of Example 3.

will be noted that this test also shows a large increase in impact strength although not quite as much as in the Izod test which is more clearly indicative of toughness since the test piece in the latter test is supported only at one end. The increase in impact resistance is obtained in a wide range of formulation being especially large in soft formulae, such as those of Examples 4 and 5, which are representative of previous formulation intended for high impact strength.

The data of Table II show, in addition, that usefulness at high temperatures is greater for high intrinsic viscosity acetate plastics since heat distortion and flow temperatures are higher. The data also show that high intrinsic viscosity helps very little in improving impact strength at normal temperatures, such as +70° F., especially for well plasticized mixtures. This is consistent with the belief of the art that there is little or no gain in strength but increase in difficulties of working as the normal viscosity characteristic is increased above present commercial levels.

Unexpectedly, it was found that high intrinsic viscosity cellulose acetate gives a nearly constant toughness and impact strength at −40° F. over a very wide range of plasticizer content, the harder

*Table I*

| Composition | Ex. 1 | Comparator A | Ex. 2 | Comparator B | Ex. 3 | Comparator C | Ex. 4 | Comparator D |
|---|---|---|---|---|---|---|---|---|
| High intrinsic viscosity cellulose acetate (lot V-1) 54.0% combined acetic acid | 72 | | 74 | | 74 | | | |
| High intrinsic viscosity cellulose acetate (lot V-2) 52.0% combined acetic acid | | | | | | | 66 | |
| Normal cellulose acetate (lot R-1) 53.0% combined acetic acid | | 72 | | 74 | | 74 | | |
| Normal cellulose acetate (lot R-2) 52.8% combined acetic acid | | | | | | | | 66 |
| Dimethyl phthalate | 7 | 7 | | | | | 8.5 | 8.5 |
| Diethyl phthalate | 21 | 21 | | | | | 25.5 | 25.5 |
| Diethylene glycol dipropionate | | | 21 | 21 | | | | |
| Triphenyl phosphate | | | 5 | 5 | 5 | 5 | | |
| Tripropionin | | | | | 21 | 21 | | |
| Intrinsic viscosity of cellulose acetate: | | | | | | | | |
| In the flake acetate stage | 2.13 | 1.43 | 2.13 | 1.43 | 2.13 | 1.43 | 1.97 | 1.44 |
| In the molding powder | 2.04 | 1.41 | 2.04 | 1.40 | 2.04 | 1.41 | 1.90 | 1.42 |
| In the molded article | 1.70 | 1.26 | 1.69 | 1.28 | 1.72 | 1.24 | 1.83 | 1.28 |
| Molding temperature, °F | 420 | 420 | 420 | 420 | 420 | 420 | 420 | 420 |
| Properties: | | | | | | | | |
| Flow temperature of the plastic, °F | 327 | 312 | 347 | 322 | 356 | 325 | 273 | 268 |
| Izod method impact strength at −40° F. ft.-lbs./inch notch | 0.60 | 0.25 | 0.69 | 0.27 | 0.59 | 0.15 | .70 | .30 |
| Increase in Izod impact strength at −40° F. per cent | 140 | | 150 | | 266 | | 133 | |

Table II gives additional examples and comparisons and shows the effect of varying formulation from a very soft formula to a hard formula, again with comparators to show the improvement obtained. The Charpy method (A. S. T. M. Designation D256) was used at the temperatures indicated for determining impact strengths. It plastics, such as in Examples 7 and 8, actually being tougher and more resistant to impact than the

*Table II*

| Composition | Ex. 4 | Comparator D | Ex. 5 | Comparator E | Ex. 6 | Comparator F | Ex. 7 | Comparator G | Ex. 8 | Comparator H |
|---|---|---|---|---|---|---|---|---|---|---|
| High intrinsic viscosity cellulose acetate (lot V-2) 52.0% combined acetic acid | 66 | | 69 | | 75 | | 78 | | 81 | |
| Normal cellulose acetate (lot R-2) 52.8% combined acetic acid | | 66 | | 69 | | 75 | | 78 | | 81 |
| Dimethyl phthalate | 8.5 | 8.5 | 7.6 | 7.6 | 6.4 | 6.4 | 5.6 | 5.6 | 4.7 | 4.7 |
| Diethyl phthalate | 25.5 | 25.5 | 23.4 | 23.4 | 18.6 | 18.6 | 16.4 | 16.4 | 14.3 | 14.3 |
| Intrinsic viscosity of cellulose acetate: | | | | | | | | | | |
| In the flake acetate stage | 1.97 | 1.44 | 1.97 | 1.44 | 1.97 | 1.44 | 1.97 | 1.44 | 1.97 | 1.44 |
| In the molding powder | 1.90 | 1.42 | 1.95 | 1.42 | 1.95 | 1.42 | 1.95 | 1.42 | 1.95 | 1.42 |
| In the molded article | 1.83 | 1.29 | 1.80 | 1.30 | 1.78 | 1.29 | 1.81 | 1.26 | 1.80 | 1.26 |
| Molding temperature, °F | 390 | 390 | 400 | 380 | 410 | 390 | 420 | 400 | 420 | 400 |
| Properties: | | | | | | | | | | |
| Heat distortion temperature by A. S. T. M. designation D256, °F | | | 129.2 | 125.6 | 140 | 134.6 | 154.4 | 150.8 | 185 | 168.8 |
| Flow temperature, °F | 273 | 268 | 281 | 256 | 285 | 271 | 300 | 279 | 302 | 284 |
| Charpy impact strength in ft.-lbs./inch notch at— | | | | | | | | | | |
| +70° F | 1.60 | 1.53 | 1.74 | 1.59 | 1.57 | 1.09 | 1.16 | 0.95 | 1.14 | 0.79 |
| −40° F | 0.52 | 0.25 | 0.59 | 0.31 | 0.56 | 0.33 | 0.62 | 0.39 | 0.62 | 0.39 |
| Increase in Charpy impact strength at −40° F., per cent | 108 | | 88 | | 70 | | 54 | | 54 | | softer plastic represented by Examples 4, 5, and 6. This permits formulation of hard plastics with excellent high temperature properties and at the same time toughness at very low temperatures. This is opposite to the belief that, to overcome brittleness, more plasticizer is desirable, and indicates that properties at −40° F. are influenced by factors different from those controlling at normal temperatures, such as +70° F.

Another example with a comparator is given in Table III. For this example, impact strength was determined at −70° F. as well as at −40° F. The data show that the improvement over previous plastics at −70° F. is about the same as at −40° F.

The intrinsic viscosity characteristic which has been found to control toughness at extremely low temperatures bears relatively little relation to the usual viscosity characteristic designation given to cellulose acetates. Cellulose acetates are usually sold under viscosity designations determined in 20% concentration. While the intrinsic viscosity of a cellulose acetate may influence the normal high concentration viscosity characteristic, the latter is usually strongly influenced by other factors usually lumped together within the term "structural viscosity." Thus, it is possible for two lots of cellulose acetate to have widely different high concentration viscosity characteristics but to have the same intrinsic viscosity.

Intrinsic viscosity is, by definition, determinable only from measurements made in concentrations below 5% and usually below about 3%, or below about 1%, according to the method used.

*Table III*

| Composition | Ex. 9 | Comparator I |
|---|---|---|
| Normal cellulose acetate (lot R-3) 52.6% combined acetic acid | | 72 |
| High intrinsic viscosity cellulose acetate (lot V-3) 52.9% combined acetic acid | 72 | |
| Dimethyl phthalate | 7 | 7 |
| Diethyl phthalate | 21 | 21 |
| Intrinsic viscosity of cellulose acetate: | | |
| In the flake stage | 2.3 | 1.23 |
| In the molding powder | 2.3 | 1.20 |
| In the molded bars | 2.1 | 1.18 |
| Molding temperature, ° F | 440 | 440 |
| Properties: | | |
| Heat distortion temperature, ° F | 156.2 | 145.0 |
| Flow temperature, ° F | 345 | 311 |
| Izod impact strength in ft.-lbs./in. notch at— | | |
| −40° F | 0.61 | 0.22 |
| −70° F | 0.58 | 0.25 |
| Increase in Izod impact strength at— | | |
| −40° F per cent | 177 | |
| −70° F do | 163 | |

It is defined as the value obtained by dividing specific viscosity of the material by concentration as concentration approaches zero as a limit. Specific viscosity is $$\frac{\text{Viscosity of solution of cellulose acetate}}{\text{Viscosity of the solvent utilized}} \text{ minus one}$$

Thus, the instrinsic viscosity is readily obtained by first determining the viscosity of three to five solutions of different concentrations of the cellulose acetate, all being below about 1% concentration, or several being below 1% and the whole group being below 3% concentration, and determining the viscosity of the solvent upon the same condition. The specific viscosity is readily calculated from these data and, in each case, is then divided by the concentration in grams per 100 grams of solution. The resulting ratio of specific viscosity to concentration is then plotted against concentration on semilog paper and the curve passing through the plotted points extrapolated to zero concentration to obtain the intrinsic viscosity at the intercept of the curve with the zero concentration line.

It will be understood that cellulose acetates having an acetic acid content of from 52.0% to 56.0% are generally readily soluble in acetone, and acetone will accordingly be used as the solvent in determining intrinsic viscosity. Where the acetate is of such extremely high viscosity that it is insoluble or only incompletely soluble in acetone, it will be understood that the intrinsic viscosity of the acetate is well in excess of 1.7.

For cellulose acetate soluble in acetone, a more convenient method of determining the intrinsic viscosity is by the application of Martin's equation. The viscosity of the cellulose acetate is determined in centipoises in 3% by weight solution of the cellulose acetate in acetone at 25° C. The intrinsic viscosity is then calculated from the relation, $$\text{Log} \frac{\text{viscosity of 3\% solution}}{\text{viscosity of solvent}} - 1 - \text{Log } 3 =$$

$$\text{Log (I. V.)} + 0.534 \text{ (I. V.)}$$

in which "I. V." stands for intrinsic viscosity. It will be understood that in presenting data and limits herein and in the claims, determination of intrinsic viscosity of cellulose acetate soluble in acetone is carried out by the above use of Martin's equation.

It will be understood that where the intrinsic viscosity of a cellulose acetate in the form of molded articles or a molding powder or a plastic composition is determined, the plastic is dissolved in acetone in such a quantity as to obtain the desired solution concentration of the cellulose acetate. Any filler or pigment is filtered off. The plasticizer present is a very small proportion of the total solution and is regarded as part of the solvent. The small content of plasticizer has no effect on the intrinsic viscosity value, provided concentrations are determined on the basis of the cellulose acetate with regard to the total solvent inclusive of the plasticizer.

To obtain an intrinsic viscosity above about 1.5 for the cellulose acetate in the finished molded article, it is usually necessary to prepare the plastic composition used for molding or shaping from an acetate having an intrinsic viscosity above about 1.7 in the flake stage; i. e., in the form in which the material is usually sold. The reason for this is that there is a slight drop in intrinsic viscosity of cellulose acetate resulting from the preparation of a molding powder. Preferably, the molding powder is made by a nondegrading method, as through the use of solvents and low milling temperature of the order of 130–200° F., or by the slurry process in which still lower temperatures are employed.

Then, in molding operations which, for the most part, are carried out by the thermo-injection or extrusion methods, the cellulose acetate is subjected to degrading temperature conditions. The important factor which has been discovered in accordance with this invention is that whatever system of molding powder manufacture or molding operation is employed in any given instance, the acetate utilized must have a sufficiently high intrinsic viscosity and must be sufficiently stable to heat so that the overall degradation caused by the manufacture of molding powder or molding is insufficient to lower the intrinsic viscosity of the acetate to below 1.5. Thus, the acetate utilized will be sufficiently stable so that upon forming a molding powder with plasticizer and acetone at 180° F. and molding an object from the powder by injection at 400° F., the intrinsic viscosity of the cellulose acetate in the final article will be above 1.5.

The intrinsic viscosity of the acetate utilized in accordance with this invention may be any value up to that inherent in undegraded native cellulose; i. e., up to about 8, as long as the acetate is thermoplastic. An acetate with an intrinsic viscosity between about 1.8 and about 3.0 in the flake stage is greatly preferred, since a figure above 1.8 assures a sufficient final intrinsic viscosity and toughness at low temperatures and a figure below 3.0 assures ready moldability to an optimum uniformity of structure. In the molded article, the intrinsic viscosity will preferably be 1.7–2.8.

The cellulose acetate employed in accordance with this invention must have a combined acetic acid content of at least 52.0% since at a lower substitution, articles prepared therefrom are too sensitive to moisture and hence are impractical. Furthermore, at above 56% combined acetic acid content, there is little if any improvement in low temperature toughness. This is surprising inasmuch as plastics prepared from high substitution acetates; i. e., above 56% combined acetic acid content, do show improved resistance to heat deformation in the same manner as the lower substitution acetates.

Cellulose acetate to be utilized in accordance with this invention may be prepared by esterification methods in which the usual degradation is avoided in pretreatment and subsequent operations and, for example, in which substantial completion of esterification is brought about very rapidly with moderate catalyst quantities and rapid, controlled achievement of peak temperatures. A suitable cellulose acetate may be prepared, for illustration, in accordance with the example following. All parts are by weight.

Eight parts of acetic acid were distributed thoroughly in 20 parts of purified cotton linters and the cotton linters agitated with the acetic acid for 45 minutes for pretreatment. A closed, jacketed acetylation vessel, equipped with a three-bladed spider agitator adapted to provide strong agitation particularly near the walls of the vessel, the vessel being of such size as to provide 0.75 sq. ft. of effective cooling surface per pound of linters (dry basis) in the charge, was first charged with a mixture consisting of 60 parts of methylene chloride, 60 parts of acetic anhydride, and 0.1 part of concentrated sulfuric acid at 25° C., and then with the pretreated cotton linters. Acetylation proceeded immediately with water at 35° C. circulated in the acetylator and the agitator rotated at 16 R. P. M. The charge warmed to an initial peak temperature of 51.5° C. (measured in the center of the agitated mass) in 11 minutes, at which time the temperature of the charge started to drop. After 25 minutes from the commencement of acetylation, the jacket water temperature was increased to 45° C. The temperature of the charge increased to 55° C. and was then held at 55–60° C. for the remainder of the acetylation; i. e., until the acetylation mass became fiber-free, the agitation being maintained throughout the reaction.

At a time 5¾ hours after introducing the cotton linters to the acetylator, the acetylation was stopped by adding 16 parts of water and 1 part of concentrated sulfuric acid. The temperature of the resulting mixture was then adjusted to 50° C. and held at that temperature until hydrolysis to the desired degree was completed. The sulfuric acid present was neutralized by addition of the equivalent amount of sodium acetate dissolved in diluent aqueous acetic acid. The resulting neutralized dope was precipitated with water and the flake so formed washed with water until free of uncombined acetic acid to produce a stable product which was then dried. The flake product had a combined acetic acid content of 53.8% and an intrinsic viscosity of 2.05. Molded plastics therefrom had an ester intrinsic viscosity of in excess of 1.6 in all cases, usually 1.7. The high intrinsic viscosity resulted from the very rapid achievement of the initial peak temperature while maintaining control thereof, bringing about the major portion of the acetylation in the initial period.

The plasticizers which are preferably employed in accordance with this invention fall into two classes: the phthalate esters, as for example, dimethyl phthalate, diethyl phthalate, dimethyl Cellosolve phthalate (the phthalate ester of the monomethyl ether of ethylene glycol), diphenyl phthalate, dibutyl phthalate, diamyl phthalate, methyl phthalyl ethyl glycolate, ethyl phthalyl ethyl glycolate, dimethoxy ethyl phthalate, dicyclohexyl phthalate, etc.; and the lower fatty acid esters of polyhydric alcohols, as for example, the polyglycol acetates and propionates, as diethylene glycol diacetate, diethylene glycol dipropionate, triethylene glycol diacetate, triethylene glycol dipropionate, etc.; the glyceryl triesters, as glyceryl triacetate, glyceryl tripropionate, etc.; pentaerythritol tetraacetate, pentaerythritol diacetate dipropionate, the mixed acetic-propionic or acetic-butyric esters of ethylene glycol, the polyglycols, glycerin, pentaerythritol, etc.

The plasticizer employed may be a single compound or a mixture of compounds. Even the so-called stiffening or hardening plasticizers, such as triphenyl phosphate, camphor and toluene ethyl sulfonamid, may be employed although the effect of improved low temperature impact strength is not so marked when these plasticizers are employed as when the aforesaid preferred plasticizers are employed. The improved impact strength at low temperatures, obtained with esters of intrinsic viscosity above 1.5, permits use of such materials where, heretofore, they were believed unsuitable where toughness was desired.

The articles or compositions may also include coloring matter and fillers, including the various pigments and dyes. Thus, for example, they may include titanium oxide, zinc oxide, whiting, iron oxide, lead chromate, chrome green, Prussian blue, phthalocyanine blue, lithol red, and the like. Molding lubricants, waxes, etc., may also be included, and, in some cases, a resin may be added. However, fillers, lubricants, waxes, resins, and the like, will be held to small amounts less than sufficient to decrease low temperature impact strengths.

It is preferred, in compounding molding powders in accordance with this invention to employ a nondegrading method such as the solvent process or the slurry mix process. Thus, in the solvent process the cellulose acetate, plasticizer, pigment, filler, or other modifiers in conjunction with a volatile solvent such as acetone or methyl ethyl ketone up to about 80% of the nonvolatile ingredients of the mixture are colloided on a roll mill at 130–200° F. The rolling is usually continued until there is substantially complete volatilization of such solvents. The colloided plastic mass may then be stripped in the form of a rough sheet and made into sheets, rods or tubes by conventional methods, or reduced to a molding powder in a suitable mill, such as a hammer mill or a rotary knife cutting mill. The molding powder may be aged to permit complete volatilization of any solvent present. In the slurry process, a suspension of the cellulose acetate in water is agitated while the desired amount of plasticizer is added. The aqueous liquid is then separated from the cellulose acetate and the latter dried. The usual molding powder will consist of granules; i. e., discrete particles of the composition, more or less granulated, and in size varying from a moderately fine powder to coarse chips. In most cases, 80% of the molding powder will pass through a 2-mesh sieve but will be held on a 100-mesh sieve.

Heretofore, it has been believed that increase in viscosity in the upper portion of the viscosity range considered practical for molding purposes tended to produce articles of imperfect structure, due to imperfect welding and flow in molding, leading to weakness and warping. In accordance with this invention, it has been found that the plastics based on cellulose acetates of extremely high intrinsic viscosity can nevertheless be molded to give articles of improved impact strength and toughness at low temperatures. Desirably, to assure adequate flow, the temperature of molding is 10° F. to 40° F. higher than that normally utilized for a plastic based on normal acetates and containing the same proportions of the same plasticizers. Thus, for injection molding, for example, the temperature range to be utilized may be between about 390° F. and about 470° F. instead of the normal range of between about 370° F. and about 430 F. However, normal molding temperatures may frequently be used.

It is believed that the advantage of low temperature toughness obtained is related to the presence of plasticizer and is explainable on the basis of this relation rather than being directly connected with longer chain length of the acetates of high intrinsic viscosity. No other theory is known which explains the very large increase in low temperature impact strength obtainable in many cases, as compared with the moderate or slight improvement obtained at ordinary room temperatures.

It is considered that the plasticizers for cellulose acetates may serve as fair solvents at molding temperatures and thus improve flowability. However, at normal room temperatures, and especially at very low temperatures, these materials are considered to be very poor solvents or substantially nonsolvents for the acetate, and thus form what is, in effect, a gel structure in which the plasticizer exists substantially as such in a matrix of acetate saturated with plasticizer. Where the acetate has an intrinsic viscosity above about 1.5, it apparently can contain only exceedingly small quantities of low molecular weight material of the type which is always present in normally degraded cellulose acetates. Such low molecular weight material is soluble in plasticizer even at low temperatures and, by causing plasticizer to solidify at low temperatures, probably brings about extreme embrittlement due to complete immobilization of the cellulose acetate chains. The effect is formation of a glass-like structure at extremely low temperatures when using normal viscosity cellulose acetate in plastics. Use of material with an intrinsic viscosity above 1.5 permits the plasticizer to remain relatively unchanged at very low temperatures, permitting it to function with the cellulose acetate in maintaining the desired physical structure.

At normal room temperatures, there is probably little change in the physical structure as compared with the usual plastics based on normal cellulose acetates. Accordingly, it is not easy to distinguish therefrom on inspection. At elevated temperatures, the matrix of longer chains, brought about by employment of an acetate of intrinsic viscosity above 1.5, is considered to require higher temperatures for elimination of the rigidity factor, and this may explain the improved resistance to stresses at elevated temperatures.

In addition to the advantages obtained by extending very considerably the useful range of temperature of cellulose acetate plastics at both extremely low temperatures and at elevated temperatures, the present invention offers an advantage due to a new principle of formulation which it presents. It has been pointed out that plastic compositions containing decreased amounts of plasticizer; i. e., the normally harder formulations, are actually tougher, as shown by higher impact strength at extremely low temperatures, than those with considerable contents of plasticizer. This permits preparation of plastic compositions and articles which are hard at normal room temperatures and which, due to lower plasticizer content, retain their hardness at moderately elevated temperatures, whereas, heretofore, it has been thought that high toughness required added plasticizer. The effect is improved stability of shape, coupled with improvement in toughness and dimensional stability at temperature extremes.

It has also been found that molding powders and compositions in accordance with this invention permit earlier removal of hot shaped forms from molds since the molded articles become stiff at higher temperatures than those normally required for safe handling.

What I claim and desire to protect by Letters Patent is:

1. A shaped or molded mass of colloided thermoplastic cellulose acetate composition comprising essentially cellulose acetate having a combined acetic acid content above about 52% and not in excess of about 56.0% and having an intrinsic viscosity in excess of about 1.5 and a plasticizer for the cellulose acetate.

2. Sheeting of a composition comprising essentially cellulose acetate having a combined acetic acid content between about 52.0% and about 56.0% and having an intrinsic viscosity in excess of about 1.5 and a plasticizer for the cellulose acetate, said sheeting being resistant to stresses produced by impact at low temperatures, such as −40° F.

3. A molded article of colloided thermoplastic cellulose acetate composition comprising 50% to 90% of an acetate of cellulose having an intrinsic viscosity above about 1.5 and a combined acetic acid content between about 52.0% and about 56.0%, the remainder of the composition (exclusive of any pigment or filler which may be present) consisting essentially of plasticizer for the acetate, said article being resistant to impact stresses at low temperatures, such as −40° F.

4. In the preparation of molded or shaped articles of plasticized cellulose acetate, the procedure for obtaining greatly improved toughness in such articles at very low temperatures, such as −40° F., which consists in forming a molding composition of cellulose acetate having a combined acetic acid content above about 52% and not in excess of about 56.0%, and having an intrinsic viscosity of at least 1.7 and having sufficient stability to maintain intrinsic viscosity at above 1.5 after subjection to a thermal molding operation, and a plasticizer for the cellulose acetate in a quantity of 10%–50% of the combined cellulose ester and plasticizer, and molding the resulting composition at a temperature of 390° F. to 470° F.

5. In the preparation of molded or shaped articles of plasticized acetate esters of cellulose, the procedure for obtaining greatly improved toughness in such articles at very low temperatures, such as —40° F., which consists in forming a molding composition of an acetate of cellulose having an intrinsic viscosity of at least 1.7, a combined acetic acid content between about 52.0% and about 56.0%, and having sufficient stability to maintain intrinsic viscosity at above 1.5 after subjection to a thermal molding operation, and plasticizer for the acetate in a quantity of 20%–35% of the combined cellulose acetate and plasticizer, and molding the resulting composition at a temperature of 390° F. to 470° F.

6. A molding powder consisting of granules of colloided thermoplastic composition comprising essentially cellulose acetate having a combined acetic acid content between about 52.0% and about 56.0%, and having an intrinsic viscosity in excess of about 1.7, and plasticizer for the cellulose acetate, said molding powder being capable of being thermally molded to an article which is resistant to stresses produced by impact at low temperatures, such as —40° F., and in which the cellulose acetate after molding has an intrinsic viscosity above 1.5.

7. A molding powder consisting of granules of a colloided thermoplastic composition comprising an acetate of cellulose having a combined acetic acid content between about 52.0% and about 56.0%, and having an intrinsic viscosity in excess of about 1.7 in a quantity of 50% to 90% of the composition, the remainder of the composition consisting essentially of plasticizer for the acetate, neglecting any pigment or filler in the composition in determining proportions, the said molding powder being capable of being thermally molded to an article which is resistant to stresses produced by impact at low temperatures, such as —40° F., and in which the cellulose acetate after molding has an intrinsic viscosity above 1.5.

8. A molding powder consisting of granules of a colloided thermoplastic composition comprising cellulose acetate having a combined acetic acid content between about 52.0% and about 56.0%, and an intrinsic viscosity between about 1.8 and about 3.0 in a quantity of from about 65% to about 80% of the composition, the remainder of the composition consisting essentially of plasticizer for the acetate, neglecting any pigment or filler in the composition in determining proportions, the said molding powder being capable of being thermally molded to an article which is resistant to stresses produced by impact at low temperatures, such as —40° F., and in which the cellulose acetate after molding has an intrinsic viscosity above 1.7.

9. A shaped or molded mass of colloided thermoplastic cellulose acetate composition comprising essentially cellulose acetate having a combined acetic acid content between about 52.0% and about 56.0%, and having an intrinsic viscosity in excess of about 1.5, and as a plasticizer therefor an ester of phthalic acid.

10. A shaped or molded mass of colloided thermoplastic cellulose acetate composition comprising essentially cellulose acetate having a combined acetic acid content between about 52.0% and about 56.0%, and having an intrinsic viscosity in excess of about 1.5, and as a plasticizer therefor a lower fatty acid ester of a polyhydric alcohol.

11. A shaped or molded mass of colloided thermoplastic cellulose acetate composition comprising essentially cellulose acetate having a combined acetic acid content between about 52.0% and about 56.0%, and having an intrinsic viscosity in excess of about 1.5, and as a plasticizer therefor diethyl phthalate.

12. A shaped or molded mass of colloided thermoplastic cellulose acetate composition comprising essentially cellulose acetate having a combined acetic acid content between about 52.0% and about 56.0%, and having an intrinsic viscosity in excess of about 1.5, and as a plasticizer therefor diethylene glycol dipropionate.

13. A shaped or molded mass of colloided thermoplastic cellulose acetate composition comprising essentially cellulose acetate having a combined acetic acid content between about 52.0% and about 56.0%, and having an intrinsic viscosity in excess of about 1.5, and as a plasticizer therefor glyceryl tripropionate.

14. A shaped or molded mass of colloided thermoplastic cellulose acetate composition comprising essentially cellulose acetate having a combined acetic acid content between about 52.0% and about 56.0%, and having an intrinsic viscosity in excess of about 1.5, and as a plasticizer therefor a mixture of diethyl and dimethyl phthalate.

15. In the preparation of molded or shaped articles of plasticized cellulose acetate, the procedure for obtaining greatly improved toughness in such articles at very low temperatures, such as —40° F., which consists in forming a molding composition of cellulose acetate having a combined acetic acid content not in excess of about 56.0%, having an intrinsic viscosity of at least 1.7 and having sufficient stability to maintain intrinsic viscosity at above 1.5 after subjection to a thermal molding operation, and a plasticizer for the cellulose acetate in a quantity of 10%–50% of the combined cellulose ester and plasticizer, by a solvent process in which the aforementioned ingredients in conjunction with a volatile solvent are colloided on a roll mill at 130–200° F., reducing the resulting composition to a molding powder on a suitable mill, and molding the powder at a temperature of 390° F. to 470° F.

16. In the preparation of molded or shaped articles of plasticized cellulose acetate, the procedure for obtaining greatly improved toughness in such articles at very low temperatures, such as —40° F., which consists in forming a molding powder of cellulose acetate having a combined acetic acid content not in excess of about 56.0%, having an intrinsic viscosity of at least 1.7 and having sufficient stability to maintain intrinsic viscosity at above 1.5 after subjection to a thermal molding operation, and a plasticizer for the cellulose acetate in a quantity of 10%–50% of the combined cellulose ester and plasticizer, by a slurry process in which said plasticizer is added to an agitated aqueous suspension of said cellulose acetate, separating the cellulose acetate from the aqueous liquid, drying the cellulose acetate, and molding the resulting dried cellulose acetate powder at a temperature between 390° F. and 470° F.

WALTER E. GLOOR.